United States Patent [19]
Rasmussen et al.

[11] Patent Number: 5,634,495
[45] Date of Patent: Jun. 3, 1997

[54] WIDE ANGLE CONTROLLER WITH DUAL FUNCTION CHECK VALVES

[75] Inventors: Kenneth G. Rasmussen, Maple Grove; Don R. Draper, Chanhassen, both of Minn.

[73] Assignee: Eaton Corporation, Cleveland, Ohio

[21] Appl. No.: 591,248

[22] Filed: Jan. 18, 1996

[51] Int. Cl.$^6$ .............................. F15B 13/04; F15B 13/10
[52] U.S. Cl. .................... 137/625.24; 60/384; 91/467
[58] Field of Search .............................. 60/384; 91/467; 137/625.24

[56] References Cited

U.S. PATENT DOCUMENTS

| | | | |
|---|---|---|---|
| 4,043,419 | 8/1977 | Larson et al. | 180/132 |
| 4,759,182 | 7/1988 | Haarstad | 60/384 |
| 4,838,314 | 6/1989 | Gage | 137/625 |
| 5,080,135 | 1/1992 | Stephenson | 137/625 |

Primary Examiner—Gerald A. Michalsky
Attorney, Agent, or Firm—L. J. Kasper

[57] ABSTRACT

A fluid controller (17) having a housing (21) and valving including a spool (41) and a follow-up sleeve (43). The spool and sleeve define a central reference plane (RP) with the housing having two annular chambers (61, 62) receiving pressurized fluid from an inlet port (23). One of the annular chambers (61) communicates pressurized fluid to the main flow control orifice (A1) in a left turn, and to the flow amplification orifice (AQ) in a right turn, while the other annular chamber (62) communicates pressurized fluid to the main flow control orifice (A1) in a right turn, and to the flow amplification orifice (AQ) in a left turn. A check valve (103,105) is associated with each of the annular chambers, such that one check valve (103) is an inlet check in a right turn and a reverse flow prevention check while manually steering in a left turn, whereas the other check valve (105) is an inlet check in a left turn and a reverse flow prevention check while manually steering in a right turn. The disclosed arrangement makes it possible to combine wide angle steering architecture with flow amplification capability, without the need to close off the amplification orifice (AQ) during manual steering.

7 Claims, 7 Drawing Sheets

WIDE ANGLE CONTROLLER WITH DUAL FUNCTION CHECK VALVES

BACKGROUND OF THE DISCLOSURE

The present invention relates to fluid controllers of the type used to control the flow of fluid from a source of fluid, such as a pump, to a fluid pressure operated device, such as a vehicle steering cylinder.

A typical fluid controller of the type to which the present invention relates includes a housing which defines various fluid ports, and further includes a fluid meter and valving and an arrangement for imparting follow-up movement to the valving in response to flow through the fluid meter. The flow through the controller valving is directly proportional to the area of the main variable flow control orifice which, in turn, is proportional to the rate at which the steering wheel is rotated.

The assignee of the present invention now commercially sells fluid controllers, under the trademark Q-AMP®, in which a known, predictable proportion of the inlet flow passes to the steering cylinder without flowing through the fluid meter, thus "amplifying" the flow in the sense that the total flow to the steering cylinder is greater than the flow capacity of the meter. Such controllers are known from U.S. Pat. No. 4,759,182, assigned to the assignee of the present invention and incorporated herein by reference. It is now known to be able to use such flow amplification controllers in applications where manual steering capability is required. In other words, the operator rotates the steering wheel and causes the fluid meter to operate as a hand pump, generating a flow of pressurized fluid to the steering cylinder, when there is no pressurized fluid present at the inlet of the controller. One way of facilitating manual steering with a controller of the flow amplification type is to close off the flow amplification path before the valving reaches its maximum displacement, which is the condition of the valving during manual steering. Unfortunately, the result is that during normal, powered steering, the flow amplification feature is gradually lost as the valving approaches its maximum displacement.

Another approach to achieving manual steering in a flow amplification controller is to place a check valve in the flow amplification path, such that it is able to prevent reverse flow of fluid in the amplification path, which otherwise would effectively "short circuit", back to the inlet port, the pressurized fluid being generated by manual rotation of the steering wheel. The use of such a check valve to facilitate manual steering is illustrated and described in U.S. Pat. No. 4,838,314, now assigned to the assignee of the present invention, and incorporated herein by reference.

In the typical fluid controller of the type described, the valving comprises a rotatable primary valve member (spool) and a relatively rotatable follow-up valve member (sleeve). The assignee of the present invention now also has commercially available a fluid controller in which the rotational displacement between the spool and sleeve can in the range of about 40 degrees to about 50 degrees, rather than the 10 degrees or 20 degrees which was typical in prior art controllers, and in some cases the displacement can be as much as 60 degrees. Such controllers are referred to as "wide angle" controllers, and a primary benefit of a wide angle controller is the ability to substantially reduce the "lateral jerk" which would previously occur when the vehicle operator had been steering in one direction, then returned the steering wheel to its centered position, thus closing the controller valving. Such wide angle controllers are illustrated and described in U.S. Pat. No. 5,080,135, also assigned to the assignee of the present invention and incorporated herein by reference.

One of the problems associated with fluid controllers has been the inability to provide a unit having wide angle architecture, but also having flow amplification capability, and with the ability to manually steer without having to close off the flow amplification path as the valving approaches maximum displacement. Prior to the present invention, it appeared that it would be necessary to choose among wide angle capability, flow amplification, manual steering capability, and keeping flow amplification open at maximum valve displacement, but that it would not be possible to have all of the above in a single unit.

In addition, certain flow amplification controller designs encountered the phenomenon of flow amplification "feed-through", in which, under certain operating conditions, fluid is fed through the flow amplification path to the steering cylinder, imparting steering movement to the vehicle, even though the steering wheel is not then being rotated.

SUMMARY OF THE INVENTION

Accordingly, it is an object of the present invention to provide an improved controller of the general type described above, but having both wide angle architecture and flow amplification capability, but with the ability to manually steer, without the loss of the flow amplification feature near maximum valve displacement.

It is a related object of the invention to provide a controller which accomplishes the above-stated object, but without the addition of complex structure which would increase the size and cost of either the controller housing or valving.

The above and other objects of the invention are accomplished by the provision of a controller operable to control the flow of fluid from a source of pressurized fluid to a fluid pressure operated device. The controller is of the type comprising housing means defining an inlet port for connection of the source of fluid, a return port for connection to a reservoir, and first and second fluid ports for connection to the fluid pressure operated device. A valve means is disposed in the housing means and has a neutral position and first and second operating positions, corresponding to left and right turn conditions, respectively. The valve means cooperates with the housing means to define a first main fluid path from the inlet port to the first control fluid port when the valve means is in the first operating position, and to define a second main fluid path from the inlet port to the second control fluid port when the valve means is in the second operating position. The valve means defines a central reference plane, a first pressure port means is disposed on a first side of the plane, and the first main fluid path comprises the first pressure port means, in a left turn condition. A second pressure port means is disposed on a second side of the plane, and the second main fluid path comprises the second pressure port means, in a right turn condition. The valve means further defines a first amplification port means disposed on the second side of the plane, and being in parallel with said first main fluid path, and a second amplification port means disposed on the first side of the plane and being in parallel with the second main fluid path.

The improved controller is characterized by the housing means defining first and second annular grooves surrounding the valve means, the first annular groove being disposed on the first side of the central reference plane and being in open fluid communication with the first pressure port means and the second amplification port means. The second annular groove is disposed on the second side of the plane, and is in open fluid communication with the second pressure port means and the first amplification port means. The housing means defines first and second fluid passages communicating between the inlet port and the first and second annular grooves, respectively, the first and second fluid passages defining a junction downstream of the inlet port. First and second check valves are disposed in the first and second fluid passages, respectively, downstream of the junction, whereby:

(i) in a left turn condition, the first check valve prevents reverse flow through the first amplification port means; and (ii) in a right turn condition, the second check valve prevents reverse flow through the second amplification port means.

BRIEF DESCRIPTION OF THE DRAWINGS

FIGS. 6, 7 and 8 are enlarged, fragmentary overlay views of the spool and sleeve valving illustrated in FIGS. 3 and 4, but on a larger scale, and with the valving in the neutral, left turn, and right turn positions, respectively.

DESCRIPTION OF THE PREFERRED EMBODIMENT

Figure 1:
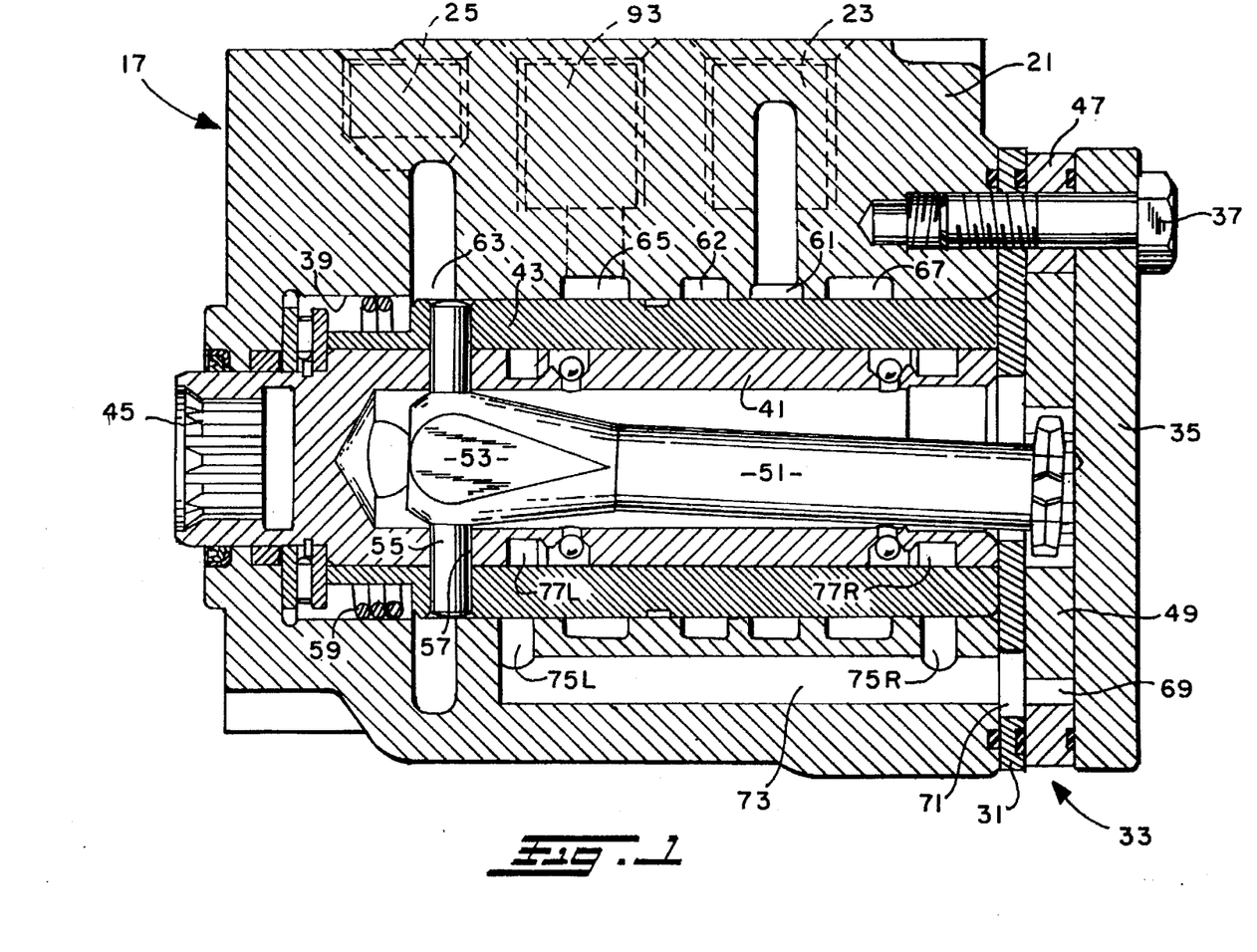
FIG. 1 is an axial cross section of a fluid controller of the type to which the present invention relates.

Referring now to the drawings, which are not intended to limit the invention, FIG. 1 illustrates a fluid controller of the type with which the present invention may be utilized. The controller, which is generally designated 17, may be of the general type illustrated and described in U.S. Pat. No. Re. 25,126, which is assigned to the assignee of the present invention and incorporated herein by reference. In the subject embodiment, the controller is more specifically of the type illustrated and described in above-incorporated U.S. Pat. No. 5,080,135.

Figure 5:
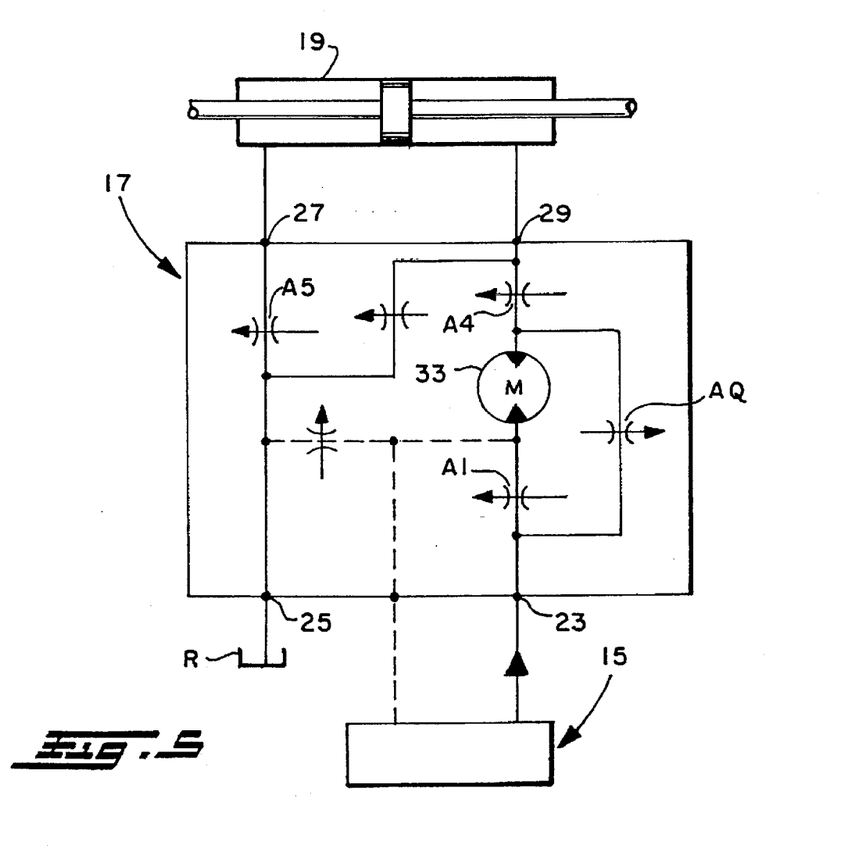
FIG. 5 is a unidirectional flow diagram illustrating the fluid controller shown in FIG. 1 as part of a hydrostatic power steering system.

Referring now to FIG. 1, in conjunction with FIG. 5, the fluid controller 17 receives pressurized fluid from a source 15, which may comprise a pump, or as is shown in the subject embodiment, a load sensing priority flow control valve, as is illustrated and described in U.S. Pat. No. 4,043,419, also assigned to the assignee of the present invention and incorporated herein by reference. As is well known to those skilled in the art, the function of the controller 17 is to control the flow of pressurized fluid from the source 15 to a fluid pressure operated device such as a steering cylinder 19.

The controller 17 includes a valve housing 21 which defines a fluid inlet port 23 connected to the source 15, a fluid return port 25, connected to a system reservoir R, and a pair of control (cylinder) fluid ports 27 and 29. In addition to the valve housing 21, the controller 17 includes a port plate 31, a section comprising a fluid meter 33, and an end cap 35. The sections are held together in tight sealing engagement by means of a plurality of bolts 37 (only one of which is shown in FIG. 1), which are in threaded engagement with the valve housing 21.

The valve housing 21 defines a valve bore 39, and rotatably disclosed therein is a valving arrangement, comprising a primary, rotatable valve member 41 (referred to hereinafter as the "spool"), and a cooperating, relatively rotatable follow-up valve member 43 (referred to hereinafter as the "sleeve"). At the forward end of the spool 41 is a portion having a reduced diameter, and defining a set of internal splines 45 which provide for direct mechanical connection between the spool 41 and a steering wheel (not shown). The spool 41 and sleeve 43 will be described in greater detail subsequently.

The fluid meter 33 may be of the type well known in the art, and in the subject embodiment, includes an internally-toothed ring member 47, and an externally-toothed star member 49, for orbital and rotational movement relative thereto, in a manner which is now well known to those skilled in the art. The star member 49 is in splined engagement with a main drive shaft 51. The drive shaft 51 has a bifurcated forward end portion 53 permitting driving connection between the shaft 51 and the sleeve 43, by means of a drive pin 55. The ends of the pin 55 pass through a pair of circumferentially-elongated pin openings 57 (see also FIG. 3), defined by the spool 41, and are received in relatively close fitting openings in the sleeve 43.

As is also well known to those skilled in the art, pressured fluid flowing from the inlet port 23 through the various passages and ports defined by the spool 41 and the sleeve 43 then flows through the fluid meter 33 causing orbitol and rotational movement of the star member 49 within the ring 47. Such movement of the star 49 causes rotational follow-up movement of the sleeve 43, by means of the drive shaft 51 and pin 55, to maintain a particular relative rotational displacement between the spool 41 and the sleeve 43, proportional to the rate of rotation of the steering wheel. The spool and sleeve are biased toward the relative neutral position, shown in FIG. 6, by means of a coiled centering spring 59 (shown only in FIG. 1), which forms no part of the present invention and will not be described further herein.

Referring again primarily to FIG. 1, the valve bore 39 of the housing 21 defines a plurality of annular fluid chambers surrounding the sleeve 43, to provide fluid communication between the various ports and the outer surface of the sleeve 43. A pair of annular chambers 61 and 62 receive pressurized fluid from the inlet port 23, as will be described in greater detail subsequently, while an annular chamber 63 communicates return fluid to the return port 25. In addition, annular chambers 65 and 67 provide fluid communication to or from the control ports 27 and 29, respectively.

The toothed interaction of the star 49 within the ring 47 defines a plurality of expanding and contracting fluid volume chambers 69, and adjacent each such chamber 69, the port plate 31 defines a fluid port 71. The valve housing 21 defines a plurality of axial bores 73 (only one of which is shown in FIG. 1), each of which is in open communication with one of the fluid ports 71. The valve housing 21 further defines a pair of radial bores 75L and 75R, providing communication between each of the axial bores 73 and the valve bore 39.

Figure 3:
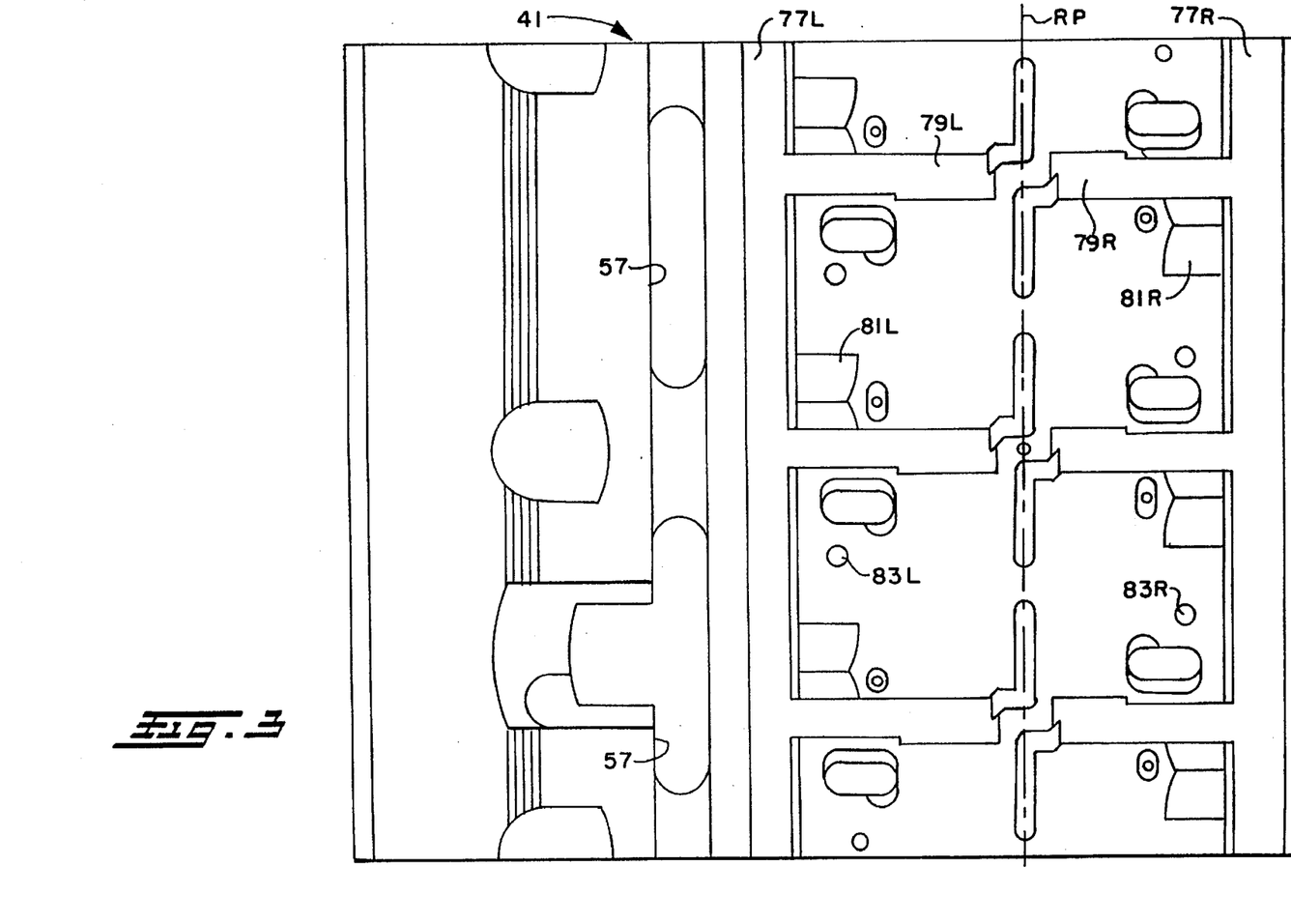
FIG. 3 is a flat layout view of the spool valve of the fluid controller shown in FIG. 1, but on a larger scale than in FIG. 1.
Figure 4:
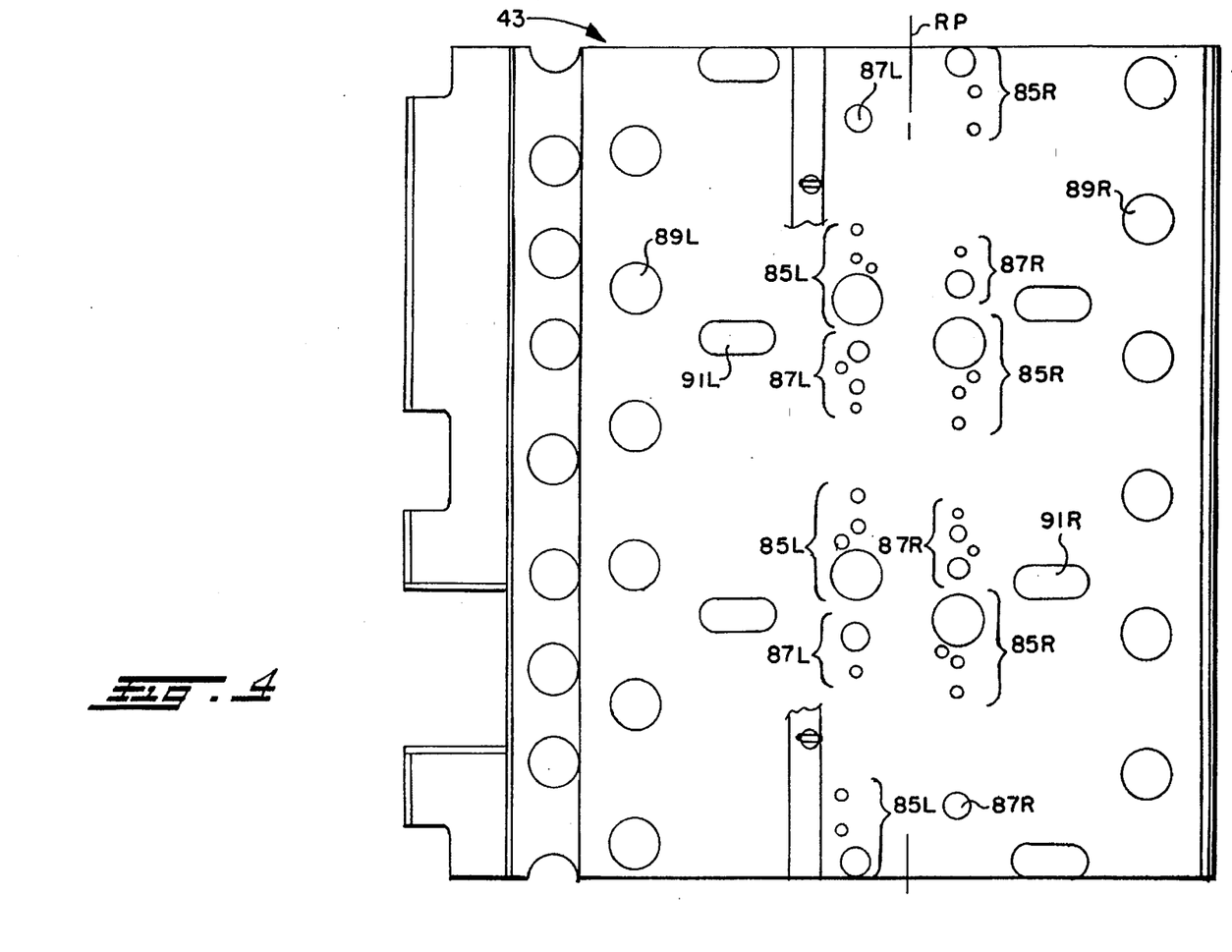
FIG. 4 is a flat layout view of the sleeve valve of the fluid controller shown in FIG. 1 and on the same scale as FIG. 3.

FIGS. 3 and 4 - Valving

Figure 6:
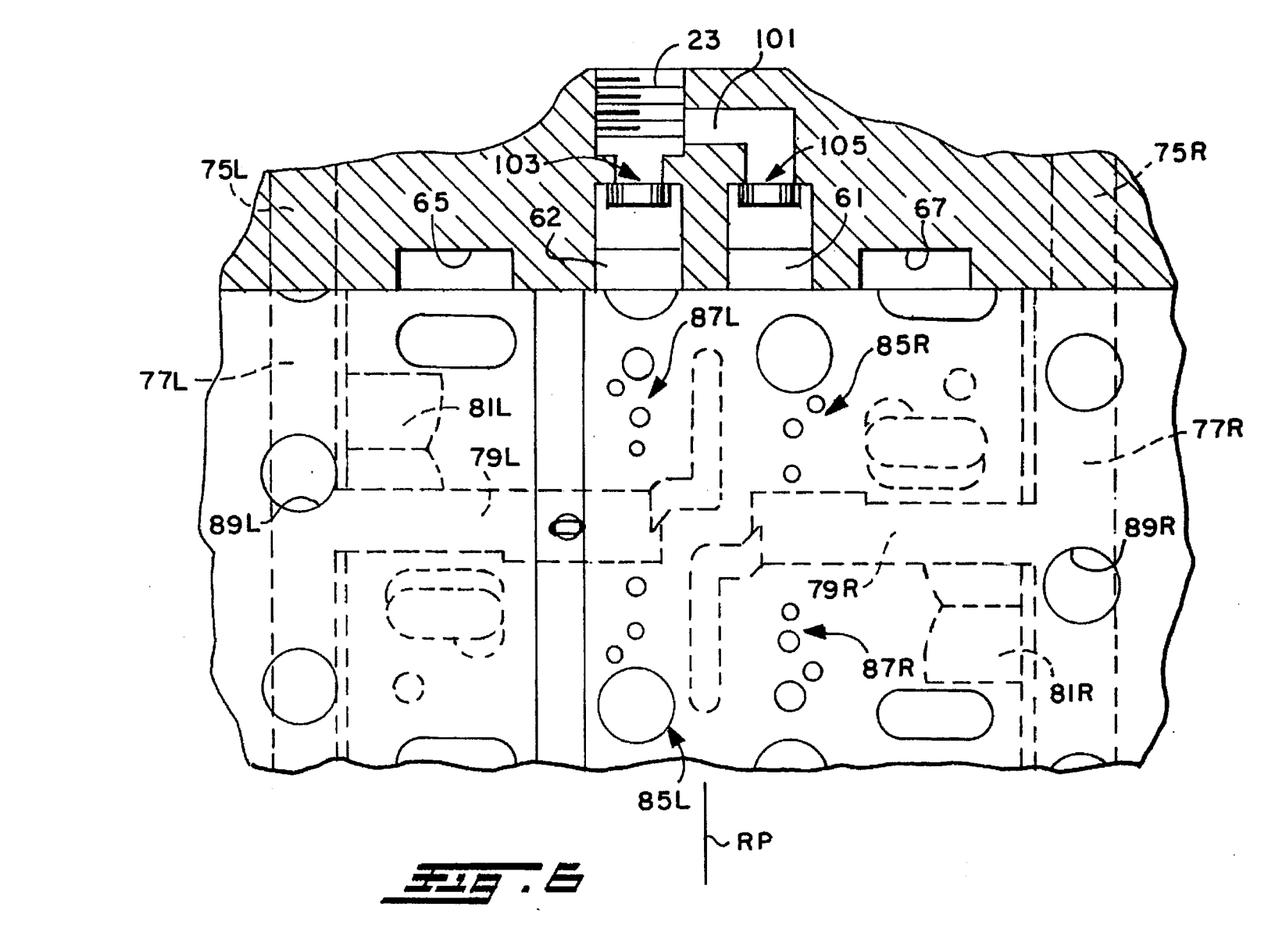
Figure 7:
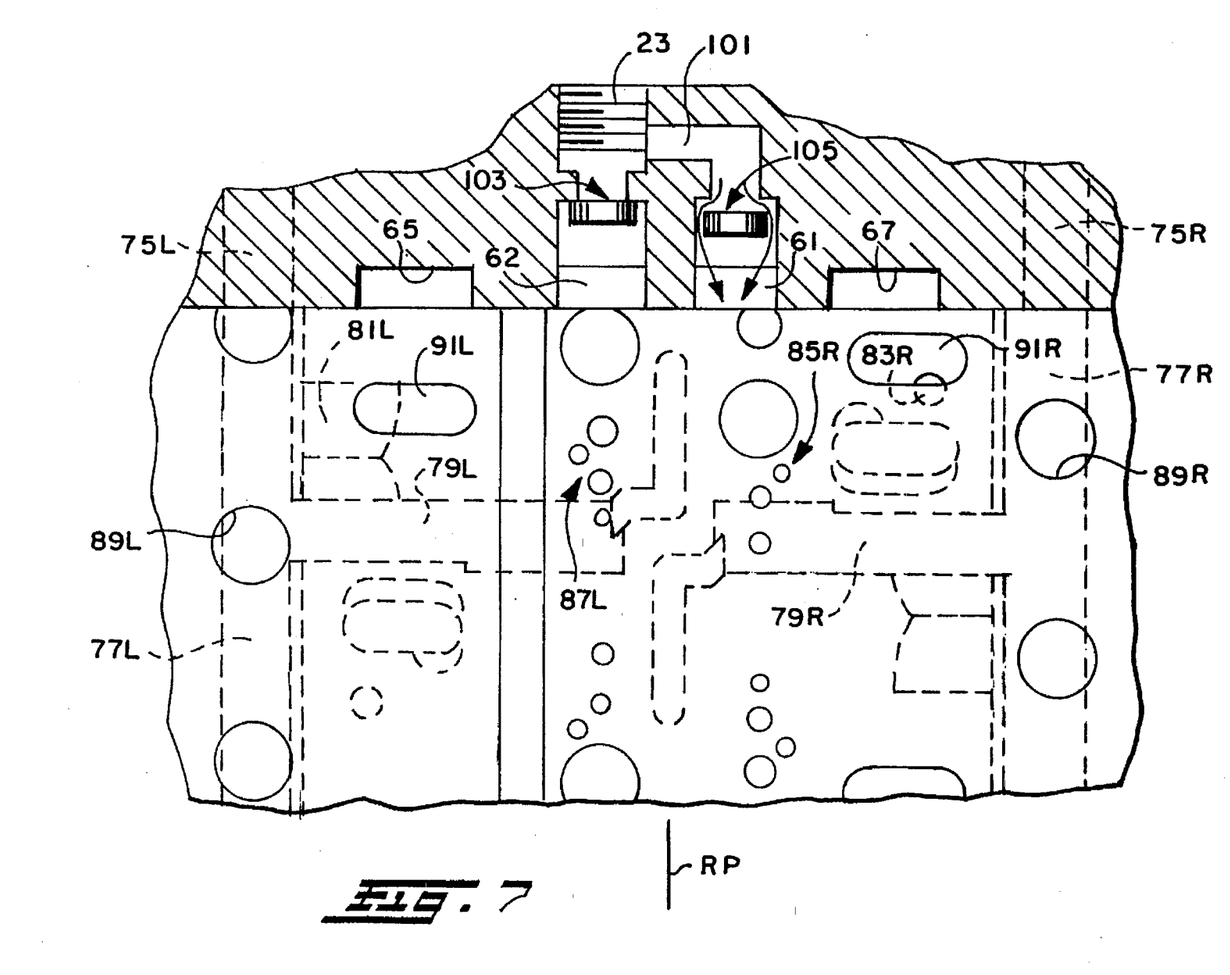

Referring now primarily to FIGS. 3 and 4, the spool 41 and sleeve 43 will be described in greater detail. In connection with the subsequent description, many of the ports and passages are arranged generally symmetrically with respect to a central reference plane RP, and such elements will be described by a reference numeral followed by either an L or an R to indicate that the element is located on either the left side or the fight side, respectively, of the reference plane RP. It should be noted that each of FIGS. 3 and 4 illustrate the entire 360° circumferential extent of the spool and sleeve, whereas the enlarged, fragmentary views of FIGS. 6–8 illustrate only a relatively small segment of the spool and sleeve, to facilitate a more detailed illustration of that portion of the valving action which is relevant to the present invention.

Referring first to FIG. 3, the spool 41 defines a pair of circumferential meter grooves 77L and 77R, which are oppositely and approximately (but not exactly) equally disposed about the reference plane RP, and are disposed to be axially aligned with the radial bores 75L and 75R, respectively. In fluid communication with the meter groove 77L are three pressure passages 79L, and in fluid communication with the meter groove 77R are three pressure passages 79R. Recessed operating areas 81L and 81R are in communication with each of the pressure passages 79L and 79R, respectively. In addition to the above-described grooves and passages which are formed on only the outer surface of the spool 41, the spool also defines three tank ports 83L and three tank ports 83R, all of which are in fluid communication with the interior of the spool, so that return fluid passes through the interior of the spool 41 and then radially outward through the pin openings 57 into the annular chamber 63, which communicates with the return port 25.

Referring now to FIG. 4, the sleeve 43 defines a group of ports which collectively comprise a pressure port 85L, and a group of ports which together comprise a pressure port 85R. In the subject embodiment, and by way of example only, there are eleven individual ports in each of the composite pressure ports 85L and 85R. In a similar manner, there are a plurality of ports which together comprise an amplification port 87L, and a plurality of ports which together comprise an amplification port 87R. In the subject embodiment, and again by way of example only, there are seven individual ports comprising each of the amplification ports 87L and 87R. Those skilled in the art will understand that the selection of the number, size, and location of each of the individual ports which comprise the pressure ports 85L and 85R and the amplification ports 87L and 87R relate to the desired flow versus displacement (i.e., of the spool 41 relative to the sleeve 43) relationship.

Approximately equally and oppositely disposed about the reference plane RP is a plurality of meter ports 89L, and a plurality of meter ports 89R. The meter ports 89L are disposed for commutating fluid communication with the radial bores 75L, and at the same time, are in fluid communication with the meter groove 77L. Similarly, the meter ports 89R are disposed for commutating fluid communication with the radial bores 75R, while being in continuous fluid communication with the meter groove 77R.

Also approximately equally and oppositely disposed about the reference plane RP are three operating ports 91L, and three operating ports 91R. The operating ports 91L are disposed to be in continuous fluid communication with the control fluid port 27 by means of the annular chamber 65, while the operating ports 91R are disposed to be in continuous fluid communication with the control fluid port 29 by means of the annular chamber 67.

Figure 2:
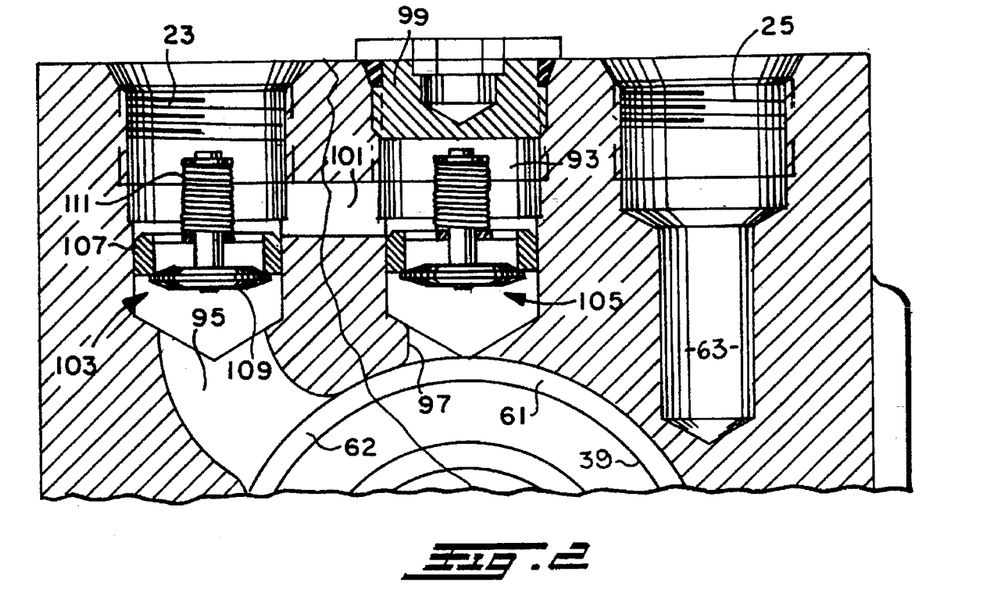
FIG. 2 is a fragmentary, transverse cross section, taken on several different planes through FIG. 1, to illustrate one particular structural aspect of the present invention.

Referring now primarily to FIG. 2, one important aspect of the invention will be described. The valve housing 21 defines a threaded bore 93, shown as being disposed between the inlet port 23 and the return port 25. It should be noted in FIG. 2 that the view is "broken", i.e., two different planes are shown. Therefore, the inlet port 23 is in the same plane as the annular chamber 62, and is in fluid communication therewith by means of a cored passage 95. Similarly, the threaded bore 93 is in the same plane as the annular chamber 61, and is in fluid communication therewith by means of a cored passage 97. The threaded bore 93 is sealed at its upper end in FIG. 2 by a threaded plug 99 (not shown in FIG. 1), and normally receives pressurized fluid from the inlet port 23 by means of a cored passage 101.

Disposed in the inlet port 23 is a check valve assembly, generally designated 103, and similarly, disposed in the threaded bore 93 is a check valve assembly, generally designated 105. Preferably, the two check valve assemblies 103 and 105 are structurally identical, and therefore, only the valve assembly 103 will be described herein. The valve assembly 103 includes a seat member 107 which may be threaded into, or may be merely glued into, the lower portion of the inlet port 23. A poppet member 109 is seated against the undersurface of the seat member 107, and is biased to the closed position shown in FIG. 2 by a biasing spring 111. It should be noted that the construction details of the check valve assembly 103 form no part of the present invention. As is well known to those skilled in the art, in the absence of fluid pressure in the inlet port 23, the poppet member 109 is biased to the closed position shown in FIG. 2. However, when pressurized fluid is introduced into the inlet port 23, the pressure overcomes the force of the spring 111 and unseats the poppet 109, permitting fluid communication from the port 23 to the annular chamber 62. Similarly, pressure in the inlet port 23 will unseat the popper member of the check valve assembly 105, permitting fluid communication through the passage 101 to the annular chamber 61.

Operation

Referring now primarily to FIGS. 6–8, in conjunction with FIG. 5, the operation of the present invention will be described. When the steering wheel is not being rotated, the spool 41 and sleeve 43 remain in the neutral position, relative to each other, which is illustrated in FIG. 6. When the spool and sleeve are in neutral, neither of the pressure ports 85L or 85R is in communication with the respective pressure passages 79L and 79R, and therefore, there is nowhere for pressurized fluid in the inlet port 23 to flow. In the neutral position shown in FIG. 6, with no flow of pressurized fluid occurring, both of the check valve assemblies 103 and 105 remain in the closed (seated) position as shown schematically in FIG. 6.

When the vehicle operator rotates the steering wheel counterclockwise for a left turn, the spool rotates in the same direction (or moves "up" relative to the sleeve in FIG. 7). As the spool 41 is rotated in a left turn position, some of the individual ports of the composite pressure port 85R begin to communicate with the pressure passages 79R, the area of overlap therebetween defining a main variable flow control orifices A1 (see FIG. 5, and note that FIG. 5 actually shows a fight turn condition, but does illustrate the various orifices to be mentioned). As the A1 orifice begins to open, pressurized fluid in the inlet port 23 flows through the passage 101, unseating the check valve assembly 105, and flowing (see arrows) into the annular chamber 61, from where it is in open fluid communication with the pressure port 85R.

In a manner well known to those skilled in the art, pressurized fluid flowing through the A1 orifice flows into the pressure passages 79R then flows into the meter groove 77R, then through the meter ports 89R, and through the radial bores 75R to the fluid meter 33. Metered fluid returning from the fluid meter 33 flows through the radial bores 75L, then through the meter ports 89L and into the meter groove 77L and the pressure passages 79L. From there the metered fluid enters the recessed operating areas 81L, each of which overlaps its respective operating port 91L to define a variable flow control orifice A4 (see FIG. 5). As will be understood by those skilled in the art, the A4 orifice is actually the total area of overlap of the three areas 81L and the three ports 91L, and similarly for each of the orifices being described herein. At the same time, and during normal operation, pressurized fluid from the inlet port 23 would also unseat the check valve assembly 103 and flow into the annular chamber 62, and from there into the amplification ports 87L. The composite amplification port 87L is now overlapping the pressure passages 79L, to define a variable amplification orifice AQ (see FIG. 5). This fluid flowing through the amplification flow path just described combines with the metered fluid in the main flow path, described previously, just upstream of the A4 orifice, and together, the main and amplification paths flow through the annular chamber 65 to the control port 27 (note again that FIG. 5 is actually illustrating a right turn). Fluid returning from the steering cylinder 19 flows through the control port 29, then through the annular chamber 67 into the operating ports 91R, which overlap the tank ports 83R to define a variable flow control orifice A5 (see FIG. 5).

It should be noted in FIG. 7 that the check valve assembly 103 is illustrated in its seated or closed position, in order to emphasize one important aspect of the present invention. In the event of a failure in the hydraulic system, whereby there is an absence of pressurized fluid at the inlet port 23, the vehicle operator can manually steer the vehicle by rotating the steering wheel to fully displace the spool 41 relative to the sleeve 43, in a manner well known to those skilled in the art. As was mentioned in the BACKGROUND OF THE DISCLOSURE, the present invention is especially significant when used with "wide angle" valving, and in the subject embodiment, maximum displacement of the spool 41 relative to the sleeve 43 requires relative rotation of about 50 degrees. The manual rotation of the steering wheel, the spool 41, and the fluid meter 33 causes pressurized fluid to be pumped by the fluid meter 33 through the meter ports 89L into the meter groove 77L, and from there through the recessed operating areas 81L, and through the A4 orifice and out to the steering cylinder in the same general manner as was described previously. During manual steering, the amplification ports 87L are in communication with the pressure passages 79L, such that pressurized fluid in the passages 79L would tend to flow through the amplification ports 87L, then out through the annular chamber 62, thus short circuiting the attempt to build up pressure manually. It is one important aspect of the present invention that the check valve assembly 103, disposed between the annular chamber 62 and the inlet port 23, prevents any such back flow or short circuiting, thus enabling manual steering, without the need to close off the AQ orifice as the spool and sleeve approach maximum relative displacement.

It should be noted that the general concept of utilizing a check valve to prevent short circuiting through the amplification flow path during manual steering is known from above-incorporated U.S. Pat. No. 4,838,314. However, the present invention makes it possible to combine wide angle steering capability with flow amplification capability, while at the same time permitting manual steering. The way in which the present invention facilitates these capabilities will be described in greater detail subsequently.

When the vehicle operator rotates the steering wheel clockwise for a right turn, the spool rotates in the same direction (or moves "down" relative to the sleeve in FIG. 8). As the spool 41 is rotated in a right turn position, some of the individual ports of the composite pressure port 85L begin to communicate with the pressure passages 79L to define the A1 orifice. As the A1 orifice begins to open, pressurized fluid in the inlet port 23 unseats the check valve assembly 103, and flows (see arrows) into the annular chamber 62, from where it is in open fluid communication with the pressure ports 85L.

In a manner well known to those skilled in the art, pressurized fluid flowing through the A1 orifice flows into the pressure passages 79L, then flows into the meter grooves 77L, then through the meter ports 89L, and through the radial bores 75L to the fluid meter 33. Metered fluid returning from the fluid meter 33 flows through the radial bores 75R, then through the meter ports 89R and into the meter groove 77R, and the pressure passages 79R. From there, the metered fluid enters the recessed operating areas 81R, each of which overlaps its respective operating port 91R to define the A4 orifice. At the same time, and during normal operation, pressurized fluid from the inlet port 23 would also unseat the check valve assembly 105, and flow into the annular chamber 61, and from there into the amplification ports 87R. The composite amplification port 87P, is now overlapping the pressure passages 79R, to define the AQ orifice. In the same manner as described in connection with a left turn, the fluid flowing through the amplification flow path combines with the metered fluid in the main flow path just upstream of the A4 orifice, and together the main and amplification paths flow through the annular chamber 67 to the control port 29 (as is shown in FIG. 5). Fluid returning from the steering cylinder 19 flows through the control port 27, then through the annular chamber 65 into the operating ports 91L, which overlap the tank ports 83L to define the A5 orifice. In a manner similar to the description of FIG. 7, the check valve assembly 105 in FIG. 8 is illustrated in its seated or closed position to illustrate an important aspect of the present invention. When the vehicle operator rotates the steering wheel to accomplish manual steering in a right turn, the rotation of the fluid meter 33 causes pressurized fluid to be pumped through the meter ports 89R into the meter groove 77R, and from there through the recessed operating areas 81 R, and through the A4 orifice and out to the steering cylinder. During manual steering, the amplification ports 87R are in communication with the pressure passages 79R, such that the pressurized fluid in the passages 79R would tend to flow through the amplification ports 87R, then out through the annular chamber 61, thus short circuiting the attempt to build up pressure manually. However, during manual steering, with no pressure at the inlet port 23, the check valve assembly 105 remains seated, as is shown schematically in FIG. 8, thus preventing any such back flow or short circuiting during manual steering.

It may thus be seen that the present invention makes it possible to combine wide angle steering architecture with flow amplification capability, and still be able to manually steer while permitting the flow amplification orifice AQ to remain open, even at maximum displacement of the spool and sleeve (i.e., the displacement which occurs during manual steering). In accordance with the present invention, this combination of capabilities is achieved by providing the two separate annular chambers 61 and 62 in communication with the fluid inlet port 23, with the annular chamber 61 providing pressurized fluid to the A1 orifice in a left turn, and providing pressurized fluid to the AQ orifice in a right turn, while the annular chamber 62 provides pressurized fluid to the AQ orifice in a left turn, while providing pressurized fluid to the A1 orifice in a right turn. Furthermore, associated with the annular chambers 62 and 61 are check valve assemblies 103 and 105, respectively, whereby, in a left turn, the check valve 105 is unseated, while the check valve 103 prevents reverse flow through the flow amplification path, in the event of manual steering. During a right turn condition, the check valve 103 is unseated, while the check valve 105 prevents reverse flow through the flow amplification path, in the event of manual steering. In other words, each check valve assembly 103 or 105 has a dual function and serves as an inlet check for one direction of steering and as a flow amplification reverse flow prevention check for the opposite direction of steering.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A controller operable to control the flow of fluid from a source of pressurized fluid to a fluid pressure operated device; said controller being of the type comprising housing means defining an inlet port for connection to the source of fluid, a return port for connection to a reservoir, and first and second control fluid ports for connection to the fluid pressure operated device; valve means disposed in said housing means and having a neutral position (FIG. 6), and first (FIG. 7) and second (FIG. 8) operating positions, corresponding to left and right turn conditions, respectively, and cooperating with said housing means to define a first main fluid path from said inlet port to said first control fluid port when said valve means is in said first operating position (FIG. 7), and to define a second main fluid path from said inlet port to said second control fluid port when said valve means is in said second operating position (FIG. 8); said valve means defining a central reference plane, first pressure port means disposed on a first side of said plane, said first main fluid path comprising said first pressure port means, in a left turn condition and second pressure port means disposed on a second side of said plane, said second main fluid path comprising said second pressure port means, in a right turn condition; said valve means further defining first amplification port means disposed on said second side of said plane, and being in parallel with said first main fluid path, and a second amplification port means disposed on said first side of said plane, and being in parallel with said second main fluid path; characterized by:

(a) said housing means defining first and second annular grooves surrounding said valve means, said first annular groove being disposed on said first side of said plane and being in open fluid communication with said first pressure port means and said second amplification port means, and said second annular groove being disposed on said second side of said plane and being in open fluid communication with said second pressure port means and said first amplification port means;

(b) said housing means defining first and second fluid passages communicating between said inlet port and said first and second annular grooves, respectively, said first and second fluid passages defining a junction downstream of said inlet port; and (c) first and second check valves being disposed in said first and second fluid passages, respectively, downstream of said junction, whereby:

(i) in a left turn condition (FIG. 7), said first check valve prevents reverse flow through said first amplification port means; and (ii) in a right turn condition (FIG. 8), said second check valve prevents reverse flow through said second amplification port means.

2. A controller as claimed in claim 1, characterized by said valve means comprising a primary, rotatable valve member, and a cooperating, relatively rotatable follow-up valve member, said primary and follow-up valve members defining said neutral position (FIG. 6), relative to each other, and said first (FIG. 7) and second (FIG. 8) operating positions in which said valve members are rotatably displaced, relative to each other, in first and second opposite directions from said neutral position (FIG. 6).

3. A controller as claimed in claim 2, characterized by said follow-up valve member being disposed radially between said primary valve member and said housing means and defining said first and second pressure port means, and said first and second amplification port means.

4. A controller as claimed in claim 1, characterized by fluid actuated means for imparting follow-up movement to said valve means proportional to the volume of fluid flow through said first and second main fluid paths, when said valve means are in said first (FIG. 7) and second (FIG. 8) operating positions, respectively, said first and second amplification port means bypassing said fluid actuated means when said valve means are in said first and second operating positions, respectively.

5. A controller as claimed in claim 1, characterized by said first main fluid path comprises a main variable flow control orifice, in a left turn condition, and said second main fluid path comprises a main variable flow control orifice, in a right turn condition, said main variable flow control orifices being open in response to displacements of said valve means in the range of about 40 degrees to about 60 degrees.

6. A controller as claimed in claim 1, characterized by said first amplification port means defining an amplification orifice, in a left turn condition, and said second amplification port means defining an amplification orifice in a right turn condition, said amplification orifices being open in response to displacements of said valve means in the range of about 40 degrees to about 60 degrees.

7. A controller as claimed in claim 1, characterized by:

(i) in a left turn condition (FIG. 7), said second check valve serves as an inlet check valve for pressurized fluid flowing from said inlet port to said first annular chamber; and (ii) in a right turn condition (FIG. 8), said first check valve serves as an inlet check valve for pressurized fluid flowing from said inlet port to said second annular chamber.

* * * * *